Jan. 25, 1966   M. G. KONING   3,231,839
ELECTRO-MAGNETIC PICK-OFF DEVICE
Filed Sept. 6, 1961
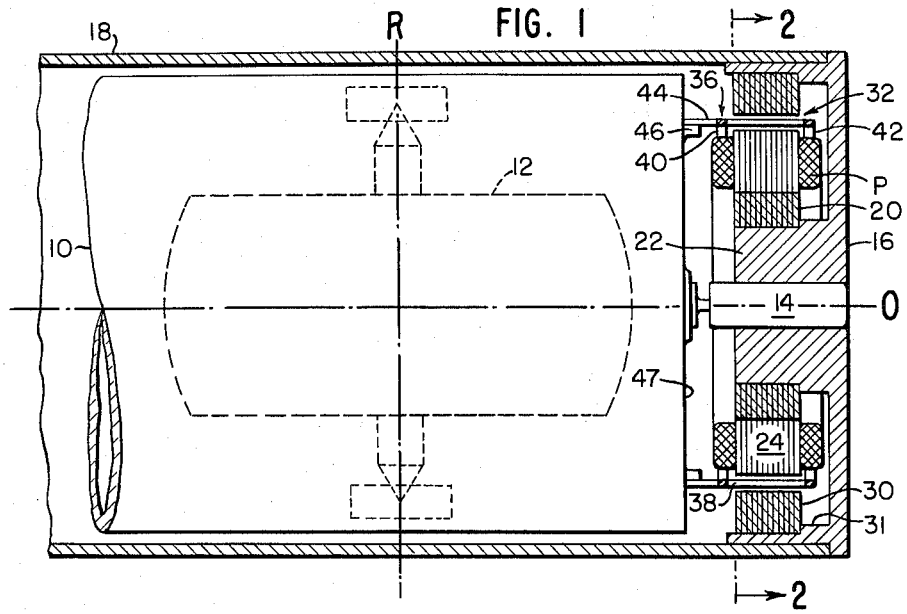
FIG. 1
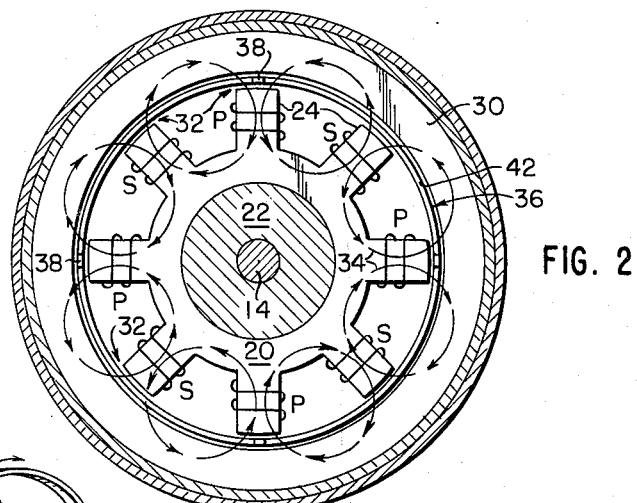
FIG. 2
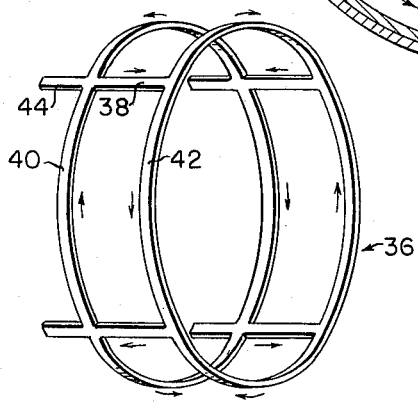
FIG. 3
FIG. 4
*INVENTOR.*
MENNO G. KONING
BY Kenway, Jenney & Hildreth
ATTORNEYS 3,231,839
ELECTRO-MAGNETIC PICK-OFF DEVICE
Menno G. Koning, Dover, Mass., assignor to Northrop Corporation, Beverly Hills, Calif., a corporation of California
Filed Sept. 6, 1961, Ser. No. 136,301
8 Claims. (Cl. 336—30)

This invention relates to electro-magnetic pick-off or transducer devices of the type which continuously measure the angular displacement of a rotor from a null position.

The present invention relates particularly to an electro-magnetic transducer in which a series of circumferentially-alternated primary and secondary windings are spaced about a magnetic core structure, and in which a non-magnetic conductive shorten-turn armature is angularly displaceable to vary the flux linkage between each primary winding and a pair of the secondary windings circumferentially adjacent thereto, which are arranged in series-opposed relationship to produce a differential output voltage whose phase and magnitude indicate the sense and extent of the displacement. As contrasted with a transducer in which a portion of a magnetic core structure is rotatable to vary the reluctance of the flux paths linking primary and secondary coils, the variable-inductance type of system with which the invention is concerned is not subject to radial, longitudinal, or torsion forces arising from relative angular movement of the rotor and stator. Furthermore, the non-magnetic shorted-turn armature incorporates relatively little mass, so that the inertia of the angularly movable device, which may typically comprise a gyroscope gimbal, may be correspondingly reduced.

A pick-off device is known in which the magnetic core structure includes a stationary yoke having circumferentially alternated primary and secondary coils, and a return ring about which are wound shorted turns of conductive wire lying in radial planes, each shorted turn being radially aligned with either the primary or the secondary coils. However, this device requires that either the yoke or the return ring be rotatable, with the result that the radial, longitudinal, and torsion forces to which the rotatable core device subjects its supports are substantially increased; the mass and inertia of the gimbal or other angularly-displaceable apparatus is also increased undesirably. Furthermore, the use of windings as shorted turns requires that they be soldered or otherwise secured to the rotatable annular core structure, necessitating a subsequent dynamic balancing operation.

It is an object of the present invention to provide an improved pick-off device for measuring the angular displacement of a rotary device with improved sensitivity, in which all of the elements of a magnetic core structure are stationarily mounted.

It is another object of the invention to provide an improved angular motion pick-off device of simplified construction which affords a high degree of efficiency in the transducing function.

It is still another object of the invention to provide an efficient angular motion pick-off device which adds a minimum of mass to an angularly-displaceable apparatus.

Further objects and advantages of the invention will become apparent as the following description proceeds.

Briefly stated, according to a preferred embodiment thereof, the improved pick-off device includes a magnetic core structure including a yoke having primary and secondary coils wound in circumferentially-alternated relation on circumferentially-spaced poles thereof, together with a return ring circumferentially spaced about the pole structure and forming equal air gaps with each pole. To this end, both the yoke and the return ring are preferably of symmetrical form.

To establish a series of closed pairs of flux paths between each primary coil and the pair of secondary coils adjacent thereto, the primary coils are series-connected and arranged in two circumferentially-alternated groups of opposed polarity, and the secondary coils are similarly arranged in two further groups of opposed polarity. Each secondary coil is normally subjected to opposed magnetic fluxes of equal intensity by the pair of primary coils circumferentially adjacent thereto, so that no net output voltage results.

The pick-off device further includes a non-magnetic conductive shorted-turn armature formed as an annular cylinder and incorporating a series of circumferentially-spaced legs interconnected by a pair of axially-spaced ring portions to form a group of shorted turns in a cage-like structure. The armature is circumferentially interposed between the yoke and the return ring, and the legs extend through the air gaps adjacent to each of the primary poles; alternatively, they may be positioned in the air gaps adjacent to each of the secondary poles.

Circulating currents are induced in opposite axial directions in each circumferentially-adjacent pair of legs and the interconnecting ring portions by the flux linkages of the primary and secondary poles; this inductive reaction of the armature with each of the pairs of flux linkages linking the secondary coils becomes unequal upon angular displacement of the armature from a null position, with the result that the opposed groups of secondary poles produce a net output voltage whose phase and magnitude bears a linear relationship to the sense and extent of the angular displacement. Each leg of the armature thus acts as a "flux gate" to control the relative intensities of the flux linkages of adjacent primary poles with their common secondary pole. The secondary poles are connected to suitable voltage-indicating means, from which the angular direction and extent of displacement of the armature may be directly inferred.

While the specification concludes with claims particularly pointing out the subject matter which I regard as my invention, it is believed that a clearer understanding will be gained from the following detailed description of a preferred embodiment thereof, referring to the accompanying drawings, in which:

FIG. 1 is a view in cross-section of the improved pick-off device, shown in combination with a schematically illustrated gyroscopic device;

FIG. 2 is a sectional view taken along line 2—2 in FIG. 1, looking in the direction of the arrows;

FIG. 3 is a pictorial view of a shorted-turn armature utilized in the pick-off device; and FIG. 4 is a schematic wiring diagram.

Referring to the drawings, the improved pick-off is shown operatively associated with a schematically illustrated gyroscope, for indicating the precessional angular displacement of a gimbal 10 about an output axis O. A rotor 12 is mounted in a conventional manner for rotation about an axis R within the gimbal, for inducing angular displacement of the gimbal in response to acceleration of the rotor about an input axis mutually perpendicular to the axes O and R, that is, perpendicular to the plane of the drawing. The gimbal of the illustrative rate gyroscope shown is mounted at one end by means of a torsion bar 14 within an end cap 16 of a casing 18, in order to damp the precessional relation in a controlled manner, and at the other end by suitable bearing means (not shown). The pick-off device affords an output signal which, in phase and magnitude, indicates the sense and angular extent of any precessional displacement of the gimbal from a null position.

The pick-off includes a stationary symmetrical annular yoke 20 which is mounted upon a central boss 22 of the end cap concentrically with the axis O, and secured by cement or other suitable means. The yoke is formed with an equally circumferentially-spaced series of pole pieces 24, upon which are wound a series of primary coils P and secondary coils S in circumferentially-alternated relation. As shown schematically in FIG. 4, the primary coils are connected in series to a source of alternating current and arranged in two opposed groups, so that adjacent coils are of opposite polarity. The secondary coils S are connected in series to output terminals 28 for supplying a net output voltage to suitable means for indicating the sense and magnitude of angular displacements of the gimbal. As shown, the secondary coils are also arranged in two opposed groups, so that adjacent coils are of opposite polarity.

The magnetic core structure of the pick-off is completed by a symmetrical return ring 30 circumferentially spaced about the yoke 20, and forming equal air gaps 32 with each pole piece 24. The return ring is mounted concentrically about the axis O upon an annular flange 31 of the end cap 16, and cemented or otherwise secured therein.

Energization of the primary coils establishes closed flux paths 34 between each primary coil and the adjacent pair of secondary coils, coupled by the yoke and the return ring. As shown, the alternate polarity of circumferentially-adjacent primary coils induces opposed flux in each secondary coil, which cancels in the null position of the pick-off illustrated, so that no net output voltage is produced.

The pick-off utilizes a non-magnetic conductive shorted-turn armature 36 as a movable element to control the relative intensities of the flux linkages between each pair of adjacent primary coils and the intermediate secondary coil by inductive reaction. The armature may be stamped from a flat sheet of conductive material, folded to a cylindrical form and welded; alternatively, it may be cut from a length of tubing, fabricated from suitable-formed sections, or formed in any other convenient manner. The armature includes a plurality of circumferentially-spaced legs 38 which extend parallel to the axis O and, in a null position, are radially aligned with the primary poles as shown in FIG. 2. Alternatively, the legs may be aligned with the secondary poles with similar results, as will become apparent from a subsequent description of the mode of operation of the pick-off. The legs 38 are interconnected by means of a pair of axially-spaced ring portions 40 and 42.

The armature is secured upon the gimbal by means of a series of leg extensions 44, cemented or otherwise suitably secured to ears 46 formed in an end surface 47 of the gimbal. This arrangement affords a stiff mounting of the armature to minimize torsional deflection and consequent error, and also accurately centers the elements on the axis O, making it feasible to reduce the width of the air gaps 32 to maximize the efficiency of the unit.

Assuming an angular displacement of the gimbal and armature in either direction the legs 38 intercept the flux linkages between each primary coil and the circumferentially-adjacent pair of secondary coils unequally. The circulating currents induced in the armature, as illustrated in FIG. 3, produce a reaction flux which counteracts the flux linkages unequally to produce an imbalance in the normally-equal opposed flux linkages affecting each secondary coil, with the result that a net output voltage is produced by the opposed groups of coils at the terminals 28. This output voltage affords an indication of the sense and extent of the displacement, in terms of the voltage and phase thereof, respectively. Since the distribution of flux lines over the ends of the poles is substantially linear, the response bears a linear relationship to the angular movement.

The improved pick-off simplifies the process of dynamic balancing in that the annular cylindrical armature may be accurately formed by conventional fabrication methods, it does not entail the inherent imbalance arising from soldering of coils about a form, and the mounting arrangement centers the mass accurately. Furthermore, since no portion of the magnetic core structure is attached to the moving gimbal, the rotary, longitudinal, and radial reaction forces induced by the movement of magnetic structure in variable-reluctance devices is eliminated. The reduction of gimbal weight minimizes the transverse loading of the torsion bars and radial support bearings required in various types of gyroscopes. The arrangement of the symmetrical return ring and yoke, in combination with the annular form and moderate thickness of the armature, provides substantially closed flux paths having minimum air gaps, and this contributes to the efficiency of the pick-off in the performance.

It will be apparent to those skilled in the art that various changes and modifications may be made without departing from the true spirit and scope of the invention. For example, the pole pieces may be carried by the annular return ring exteriorly of the armature with an equivalent result. Any number of primary and secondary coils may be utilized as desired, provided that the number of legs of the armature corresponds to half the total number of poles, and the primary and secondary poles are circumferentially alternated and arranged in alternated series-opposed groups as described. I therefore intend to define the invention in the appended claims without limitation to specific details of construction herein described by way of illustration.

What I claim is:

1. An electromagnetic transducer comprising a stationary magnetic core structure including a circular yoke and a return ring concentric with said yoke and radially spaced apart therefrom, said yoke being provided with at least four equally circumferentially spaced poles comprising circumferentially-alternated primary and secondary poles and forming equal air gaps with said core structure, a pair of windings on said primary poles interconnected in series opposition and a pair of windings on said secondary poles interconnected in series opposition, and a non-magnetic conductive shorted-turn armature of annular cylindrical form having legs disposed in said air gaps adjacent circumferentially-alternate one of said poles, said armature having a null position in which equal and opposite voltages are induced in said secondary windings in response to a voltage applied across said primary windings, said armature being angularly movable with respect to said core to reduce the voltage induced in one of said secondary pole windings and increase the voltage induced in the other.

2. An electromagnetic transducer comprising a stationary magnetic core structure including a symmetrical yoke and a symmetrical return ring concentrically spaced from said yoke, said yoke being provided with at least four equally circumferentially-spaced poles comprising circumferentially-alternated primary and secondary poles and forming equal air gaps with said core structure, a pair of windings on said primary poles interconnected in series opposition and a pair of of windings on said secondary pole interconnected in series opposition, and a non-magnetic conductive shorted-turn armature of annular cylindrical form having legs disposed in said air gaps adjacent circumferentially-alternate ones of said poles, said armature having a null position in which equal and opposite voltages are induced in said secondary windings in response to a voltage applied across said primary windings, said armature being angularly movable with respect to said core to reduce the voltage induced in one of said secondary pole windings and increase the voltage induced in the other.

3. An electromagnetic transducer as recited in claim 2, in which said legs are circumferentially spaced about, and extend generally parallel to, the axis of symmetry of said yoke.

4. An electromagnetic transducer comprising a stationary magnetic core structure including a symmetrical yoke and a symmetrical return ring concentrically spaced from said yoke, said yoke being provided with a plurality of equally circumferentially-spaced poles comprising circumferentially-alternated primary and secondary poles and forming equal air gaps with said core structure, windings on said primary poles connected in two circumferentially-alternated primary groups, said primary groups being arranged in series opposition to one another, and windings on said secondary poles connected in two circumferentially-alternated secondary groups, said secondary groups being arranged in series opposition to one another, and a non-magnetic conductive shorted-turn armature of annular cylindrical form having legs disposed in said air gaps adjacent circumferentially-alternate ones of said poles, said armature having a null position in which equal and opposite voltages are induced in said secondary windings in response to a voltage applied across said primary windings, said armature being angularly movable with respect to said core to reduce the voltage induced in one of said secondary pole windings and increase the voltage induced in the other.

5. An electromagnetic transducer comprising a stationary magnetic core structure including a symmetrical yoke and an annular symmetrical return ring concentrically spaced from said yoke, said yoke including a series of circumferentially-spaced poles forming equal air gaps with said core structure, a plurality of primary and secondary coils wound in circumferentially-alternated relation on said poles, said primary coils being connected in two circumferentially-alternated primary groups, said primary groups being arranged in series opposition to one another, said secondary coils being connected in two circumferentially-alternated secondary groups, said secondary groups being arranged in series opposition to one another, such that each of said secondary coils is linked by opposed magnetic flux with one circumferentially-adjacent primary coil of each of said primary groups, and a non-magnetic conductive armature including a plurality of legs, disposed in said air gaps adjacent circumferentially-alternate ones of said poles, said armature further including a pair of ring portions each interconnecting corresponding ends of said legs to form shorted turns, said armature being angularly displaceable with respect to said core structure to vary the relative intensity of the opposed flux linking each of said secondary coils to induce a net output voltage therein whose phase and amplitude is responsive to the sense and magnitude of the angular displacement of said armature from a null position.

6. An electromagnetic transducer as recited in claim 5, in which said legs are circumferentially spaced about, and extend generally parallel to, the axis of symmetry of said yoke; and in which said legs are extended beyond one of said ring portions for mounting said armature upon apparatus angularly-displaceable about said axis of symmetry.

7. An electromagnetic transducer as recited in claim 6, in combination with apparatus mounted for angular displacement about said axis of symmetry, said apparatus having ears circumferentially spaced about said axis of symmetry for engagement with the extensions of said legs to position said armature concentrically about said axis of symmetry.

8. An electromagnetic transducer comprising a stationary magnetic core structure including a symmetrical yoke and an annular symmetrical return ring concentrically spaced about said yoke, said yoke including a series of circumferentially-spaced poles forming equal air gaps with said return ring, a plurality of primary and secondary coils wound in circumferentially-alternated relation on said poles, said primary coils being connected in two circumferentially-alternated primary groups, said primary groups being arranged in series opposition to one another, said secondary coils being connected in two circumferentially-alternated secondary groups, said secondary groups being arranged in series opposition to one another, such that each of said secondary coils is linked by opposed magnetic flux with one circumferentially-adjacent primary coil of each of said primary groups, and a non-magnetic conductive armature including a plurality of legs circumferentially spaced about, and extending generally parallel to, the axis of symmetry of said yoke, said legs being disposed in said air gaps adjacent circumferentially-alternate ones of said poles, said armature further including a pair of ring portions each interconnecting corresponding ends of said legs to form shorted turns, said armature being angularly displaceable with respect to said core structure to vary the relative intensity of the opposed flux linking each of said secondary coils to induce a net output voltage therein whose phase and amplitude is responsive to the sense and magnitude of the angular displacement of said armature from a null position.

References Cited by the Examiner
UNITED STATES PATENTS

| 2,612,635 | 9/1952 | West et al. | 336—79 |
| 2,700,739 | 1/1955 | Orlando | 336—79 X |
| 2,909,739 | 10/1959 | Cherniak | 336—135 X |
| 3,041,486 | 6/1962 | Moffit | 336—135 X |

JOHN F. BURNS, *Primary Examiner.*